United States Patent [19]

Garber et al.

[11] 4,060,591

[45] Nov. 29, 1977

[54] CONTINUOUS PROCESS FOR RECOVERING PURE, CONCENTRATED AMMONIA

[75] Inventors: Alfred Garber, Linz, Austria; Hans-Martin Stönner, Schwalbach, Germany; Paul Wiesner, Oberursel, Germany; Alan Sinclair, Frankfurt am Main, Germany; Alfred Schmidt, Wien, Austria

[73] Assignees: Metallgesellschaft Aktiengesellschaft, Frankfurt am Main, Germany; Chemie Linz Aktiengesellschaft, Linz, Austria

[21] Appl. No.: 690,203

[22] Filed: May 25, 1976

[30] Foreign Application Priority Data

June 24, 1975  Germany .............................. 2527985

[51] Int. Cl.² .......................... C01C 1/10; C01C 1/12; B01D 19/00

[52] U.S. Cl. ...................................... 423/352; 55/36; 55/70; 423/237

[58] Field of Search ............... 423/352, 234, 237, 238, 423/236; 55/36, 38, 39, 70

[56] References Cited

U.S. PATENT DOCUMENTS

| | | | |
|---|---|---|---|
| 1,936,864 | 11/1933 | Sperr ................................... | 423/352 |
| 2,162,838 | 6/1939 | Cole et al. ............................ | 423/234 |
| 3,556,721 | 1/1971 | Badusch .............................. | 423/234 |
| 3,789,105 | 1/1974 | Tippmer et al. ..................... | 423/234 |

*Primary Examiner*—Edward J. Meros
*Attorney, Agent, or Firm*—Burgess, Dinklage & Sprung

[57] ABSTRACT

Pure, concentrated ammonia is recovered from aqueous liquors by stripping off gas water, de-acidifications, scrubbing and withdrawing ammonia from the top of a scrubbing column.

17 Claims, 7 Drawing Figures

FIG. 1.

| | NH$_3$ | CO$_2$ | H$_2$S | H$_2$O | HCN | PRESSURE (BARS) | TEMP. (°C) | |
|---|---|---|---|---|---|---|---|---|
| A | 1250 | 500 | 50 | 100000 | 1 | 1 | 55 | NORMALITY d~1.00 ← → NORMAL 0.735 NH$_3$ 0.2273 CO$_2$ 0.0294 H$_2$S |
| B | 10 | <2 | <1 | 100000 | 1 | 1 | 40 | |
| C | <1 | 500 | 50 | <2 | <0.1 | 15 | 30 | |
| D | 1240 | <1 | <0.01 | <1 | <0.001 | 17 | 30 | |
| E | 647 | 176 | 30 | 5079 | 0.5 | 15 | 150 | |
| F | 647 | 676 | 80 | 4479 | 0.5 | 15 | 75 | |
| G | 419 | 114 | 19 | 3286 | 0.3 | 14 | 45 | |
| H | 228 | 62 | 11 | 1793 | 0.2 | 14 | 45 | |
| I | 1468 | 562 | 61 | 697 | 0.2 | 1.1 | 70 | |
| K | 1422 | 1.4 | <0.1 | 49 | <0.1 | 1 | 35 | |
| L | 1554 | <1 | <0.01 | <1 | <0.001 | 4 | 0 | N.C = NOT CONSIDERED (CO$_2$+H$_2$S):(NH$_3$)=0.44 CO$_2$:H$_2$S = 10 |
| M | 182 | 1.4 | <0.1 | 49 | <0.1 | 4 | 3 | |
| N | 314 | N.C | N.C | N.C | N.C | 17 | 30 | |
| O | N.C | N.C | N.C | 496 | N.C | 18 | 35 | |
| P | N.C | N.C | N.C | 496 | N.C | 35 | 35 | |
| Q | N.C | | | | | 1 | 35 | |
| R | 969 | 722 | 120 | 4571 | 0.6 | 1.1 | 55 | |
| S | 322 | 46 | 40 | 92 | 0.1 | 1.1 | 56 | |
| T | N.C | N.C | N.C | 600 | N.C | 18 | 35 | |

FIG. 2.

| | NH₃ | CO₂ | H₂S | H₂O | HCN | N₂ | SOL-VENT | PRESSURE (BARS) | TEMP. (°C) |
|---|---|---|---|---|---|---|---|---|---|
| A | 1250 | 2125 | 38 | 97977 | 1 | 61 | 4 | 4 | 50 |
| B | 10 | <2 | <1 | 97960 | 0.5 | <0.1 | <0.1 | 1 | 40 |
| C | <1 | 2125 | 38 | 17 | 0.5 | 50 | 4 | 4 | 30 |
| D | 1240 | <1 | <0.01 | <1 | <0.001 | N.C | <0.01 | 17 | 30 |
| E | 1591 | 342 | 12 | 105710 | 0.6 | 11 | 0.2 | 4 | 135 |
| F | 341 | 342 | 12 | 2065 | <0.1 | N.C | 0.2 | 4 | 75 |
| G | 12 | 3 | N.C | 799 | N.C | N.C | N.C | 1 | 50 |
| H | 1579 | 339 | 12 | 104911 | 0.6 | 11 | 0.2 | 1.1 | 50 |
| I | 1569 | 338 | 12 | 770 | 0.1 | 11 | 0.2 | 1.1 | 70 |
| K | 1422 | 1.4 | <0.1 | 49 | <0.1 | 11 | N.C | 1 | 35 |
| L | 1554 | <1 | <0.01 | <1 | <0.001 | 11 | | 4.5 | 0 |
| M | 166 | 1.4 | <0.1 | 49 | <0.1 | | | 4.5 | 5 |
| N | 298 | N.C | N.C | N.C | N.C | N.C | | 17 | 30 |
| O | N.C | N.C | N.C | 496 | N.C | N.C | | 18 | 35 |
| P | 16 | N.C | N.C | 496 | N.C | N.C | | 17 | 47 |
| Q | <0.001 | N.C | <0.001 | N.C | <0.0001 | 11 | | 1 | 35 |
| R | 556 | 401 | 48 | 2122 | 0.3 | 0.4 | | 1 | 60 |
| S | 215 | 59 | 36 | 57 | 0.2 | 0.3 | | 1 | 60 |
| T | N.C | N.C | N.C | 5686 | N.C | N.C | | 18 | 35 |

| | $NH_3$ | $CO_2$ | $H_2S$ | $H_2O$ | HCN | TOTAL | PRESSURE (BARS) | TEMP. (°C) |
|---|---|---|---|---|---|---|---|---|
| A | 5000 | 4500 | 500 | 100000 | 2 | 110002 | | 50 |
| B | 10 | | | 99995 | 2 | 100007 | | 50 |
| C | | 4500 | 500 | | | 5000 | 9 | 35 |
| D | 4990 | 2 | | 5 | | 4997 | | |
| E | 6237 | 943 | 294 | 111383 | 4 | 118861 | 9 | 154 |
| F | 1237 | 943 | 294 | 5383 | 2 | 7859 | 1 | 80 |
| G | 52 | 8 | 2 | 924 | | 986 | | 35 |
| H | 6185 | 935 | 292 | 110459 | 4 | 117875 | | |
| I | 6175 | 935 | 292 | 2468 | 2 | 9872 | | |
| K | 5839 | 6 | | 231 | | 6076 | 1 | 35 |
| L | | | | | | | | |
| M | 849 | 4 | | 226 | | 1079 | 4 | 3 |
| N | | | | | | | | |
| O | | | | 1996 | | 1996 | | 35 |
| P | | | | 1996 | | 1996 | | |
| Q | | | | | | | | |
| R | 2261 | 1025 | 490 | 5543 | 3 | 9322 | | 54 |
| S | 1024 | 82 | 196 | 160 | 1 | 1463 | | 60 |
| T | | | | 6000 | | 6000 | | |

A: $d \simeq 1.05$
$NH_3 = 2.8\ n$
$CO_2 = 1.95\ n$
$H_2S = 0.28\ n$

| | $NH_3$ | $CO_2$ | $H_2S$ | $H_2O$ | HCN | TOTAL | PRESSURE (BARS) | TEMP. (°C) |
|---|---|---|---|---|---|---|---|---|
| A | 5000 | 4500 | 500 | 100000 | 2 | 110002 | | |
| B | 10 | | | 99995 | 2 | 100007 | | |
| C | | 4500 | 500 | | | 5000 | | |
| D | 4990 | 2 | | 5 | | 4997 | | |
| E | 7078 | 2578 | 294 | 57880 | 10 | 67840 | 9 | 140 |
| F | 7078 | 7078 | 794 | 51880 | 10 | 66840 | | 82 |
| G | 5609 | 2043 | 233 | 45870 | 8 | 53763 | | |
| H | 1469 | 535 | 61 | 12010 | 2 | 14077 | | |
| I | 6459 | 5035 | 561 | 4020 | 2 | 16077 | | |
| K | 5833 | 6 | | 231 | | 6070 | 1 | 35 |
| L | | | | | | | | |
| M | 843 | 4 | | 226 | | 1073 | 4 | 3.1 |
| N | | | | | | | | |
| O | | | | 1996 | | 1996 | | |
| P | | | | 1996 | | 1996 | | |
| Q | | | | | | | | |
| R | 11528 | 7679 | 1324 | 52842 | 14 | 73387 | | 50 |
| S | 4450 | 601 | 530 | 962 | 4 | 6547 | | 62 |
| T | | | | 6000 | | 6000 | | 35 |

A: $d \simeq 1.05$
$NH_3 = 2.8 n$
$CO_2 = 1.95 n$
$H_2S = 0.28 n$

| | $NH_3$ | $CO_2$ | $H_2S$ | $H_2O$ | HCN | TOTAL | PRESSURE (BARS) | TEMP. (°C) |
|---|---|---|---|---|---|---|---|---|
| A | 3000 | 5000 | 150 | 91848 | 2 | 100000 | | |
| B | 10 | | | 91843 | 2 | 91855 | | |
| C | | 5000 | 150 | | | 5150 | | |
| D | 2990 | 2 | | 5 | | 2997 | | |
| E | 4549 | 1649 | 64 | 105858 | 4 | 112124 | 4.2 | 124 |
| F | 1549 | 1649 | 64 | 7343 | 2 | 10607 | 4.2 | 78 |
| G | 178 | 65 | 3 | 4145 | <0.16 | 4391 | | |
| H | 4371 | 1584 | 61 | 101713 | 4 | 107733 | | |
| I | 4361 | 1584 | 61 | 2004 | 2 | 8012 | 1.1 | |
| K | 3485 | 6 | | 138 | | 3629 | 1 | 35 |
| L | | | | | | | | |
| M | 495 | 4 | | 133 | | 632 | 4 | 3 |
| N | 748 | | | | | 748 | | |
| O | | | | 1200 | | 1200 | | |
| P | | | | 1200 | | 1200 | | |
| Q | | | | | | | | |
| R | 2164 | 1714 | 107 | 7439 | 3 | 11427 | 1.1 | 58 |
| S | 615 | 65 | 43 | 96 | 1 | 820 | 1.1 | 58 |
| T | | | | 6667 | | 6667 | 4.2 | 35 |

| | $NH_3$ | $CO_2$ | $H_2S$ | $H_2O$ | HCN | TOTAL | PRESSURE (BARS) | TEMP. (°C) |
|---|---|---|---|---|---|---|---|---|
| A | 15040 | 15930 | 3540 | 65410 | 80 | 100000 | 1 | 55 |
| B | 8 | | | 65395 | 30 | 65433 | 1 | 40 |
| C | | 15924 | 3540 | | 50 | 19514 | 20 | 35 |
| D | 15032 | 6 | | 15 | | 15053 | | |
| E | 23126 | 7962 | 625 | 118409 | 99 | 150221 | 20 | 155 |
| F | 8083 | 7956 | 625 | 32999 | 60 | 49723 | 20 | 80 |
| G | 3521 | 1212 | 95 | 18029 | 15 | 22872 | 19 | 45 |
| H | 19605 | 6750 | 530 | 100380 | 84 | 127349 | 19 | 45 |
| I | 19593 | 6750 | 530 | 8971 | 42 | 35886 | 1,1 | 70 |
| K | 17563 | 26 | | 694 | | 17283 | 1 | 35 |
| L | | | | | | | | |
| M | 2531 | 20 | | 679 | | 3230 | 4 | 3 |
| N | | | | | | | | |
| O | 1 | | | 6014 | 3 | 6018 | 20 | 35 |
| P | 1 | | | 6014 | 3 | 6018 | | 35 |
| Q | | | | | | | | |
| R | 12148 | 8607 | 1042 | 33647 | 86 | 55530 | 1,1 | 55 |
| S | 4065 | 651 | 417 | 648 | 26 | 5807 | 1,1 | 56 |
| T | 3 | | | 20000 | 9 | 20012 | 20 | 35 |

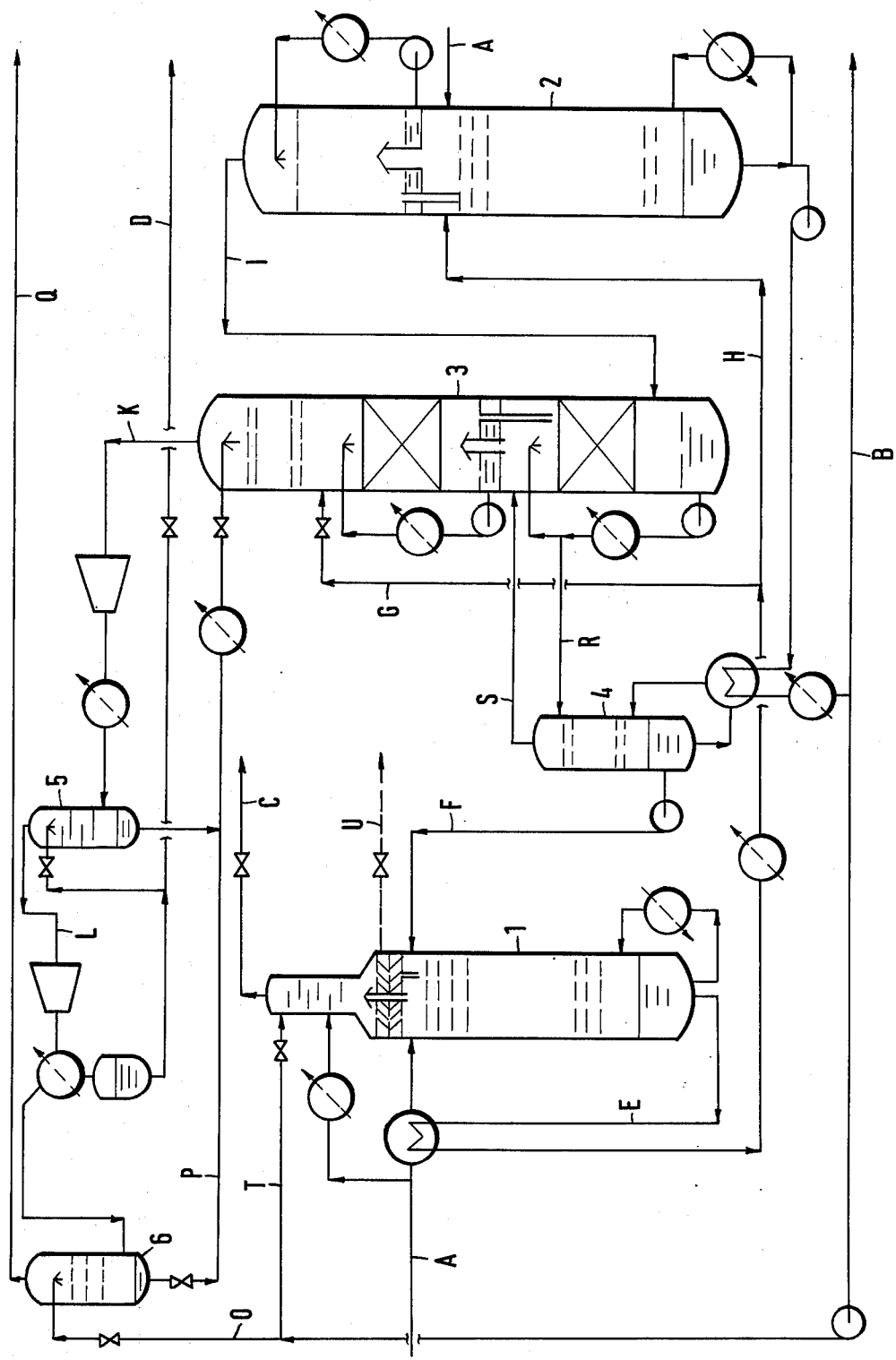

CONTINUOUS PROCESS FOR RECOVERING PURE, CONCENTRATED AMMONIA

BACKGROUND

This invention relates to a process of recovering pure, concentrated ammonia from waste water which has preferably been freed to a large extent from dust, tar, oil, phenols and other organic substances and which consists particularly of condensates formed during the gasification or degasification of coal, or from aqueous liquors of similar composition, which in addition to ammonia contain acid constituents, such as carbon dioxide, hydrogen sulfide, small quantities of free and/or combined hydrocyanic acid and possibly residual quantities of a solvent used in a preceding dephenolation, which process comprises a stripping of gas water, de-acidification, and scrubbing.

Such solutions contain ammonia in concentrations between about 0.1 and 12 n, preferably between 0.3 and 3 n, carbon dioxide in concentrations between 0.1 and 12 n, preferably between 0.2 and 3 n, hydrogen sulfide in concentrations between 0.003 and 3 n, preferably between 0.003 and 0.3 n, and possibly hydrocyanic acid in an amount between 0.001 and 1 g/l.

In the solutions to be processed according to the invention, the weight ratio of the acid constituents ($CO_2$ + $H_2S$) to the basic $NH_3$ may be equal to or larger than unity or equal to or smaller than unity.

The process according to the invention enables a recovery of ammonia as an end product in a yield of virtually 100% and with a content of not more than 0.2% $H_2O$, 0.1% $CO_2$, 10 ppm $H_2S$, and 10 ppm HCN. The resulting waste water is sufficiently pure for direct biological purification, if required.

The conditions of the present process are so selected that solutions having a surplus of acid constituents can be processed as well as solutions having a surplus of ammonia and that this can be accomplished without a substantial change of the conditions maintained during the several steps of the process. For an optimum control of the process, a simple change of the process sequence is sufficient. This change does not involve any problem as far as equipment is concerned and has not the least adverse influence on the purity of the end product, which is required to be of high purity for many purposes. If the weight ratio of acid constituents to ammonia is equal to or approximates unity, the selection of one or the other process sequences covered by the invention will be governed by economical considerations, e.g., in view of the concentrations or inert contents of the solutions to be processed.

Prior investigations have shown that the processing of solutions which contain ammonia and carbon dioxide and contain also free and/or combined hydrogen sulfide and possibly hydrocyanic acid rise to problems which are absent in the processing of solutions which contain only ammonia and carbon dioxide. See, e.g., H. Umbach: Die Entsauerung von Ammoniakwasser, Archiv fur bergbauliche Forschung, Year 3. No. 1, 1942, pages 49 et seq.).

From the published experimental data, it is apparent that ammonia in a particularly high purity as is required for numerous purposes cannot be recovered at all from pressurized gas water. Whereas in the process described there, the quantity of $CO_2$ stripped off can be increased as desired by an increase in pressure so that an aqueous solution of ammonia which is virtually free from carbon dioxide is obtained in the sump of the column, the quantity of $H_2S$ which is stripped off cannot be increased in this way and pressures under which all $CO_2$ is stripped off result in an incomplete stripping off $H_2S$ and vice versa so that ammonia meeting the above-mentioned specifications cannot be obtained.

A recovery of gaseous ammonia from strong ammonia water having a ($CO_2$ + $H_2S$) : $NH_3$ weight ratio < 1 is described in German Patent 118,765. In that process, strong ammonia water must be diluted to an ammonia content of about 7–10% and must subsequently be de-acidified under pressures up to 15 kg/cm² above atmospheric pressure. The partly de-acidified ammonia water is stripped off. The resulting exhaust gases contain $CO_2$ and $NH_3$ and must then be scrubbed in a scrubber with the original, $H_2S$-containing, strong ammonia water, which absorbs $CO_2$, whereas pure ammonia is said to escape overhead. Any $H_2S$ contained in these exhaust gases is removed in a subsequent scrubber. That process has the disadvantage that the pressure de-acidification stage is loaded in operation by the water which has been added at a high rate to the strong ammonia water, which has previously been concentrated. Another decisive disadvantage of the process resides in that ammonia having the above-mentioned purity cannot be produced at all in this manner. As has been mentioned above, it is essential to scrub the resulting exhaust gases, which contain $NH_3$ and $CO_2$, with the strong ammonia water which is to be processed. In view of experimental data published more than 20 years ago it can be proved clearly that the $H_2S$ vapor pressure of the strong ammonia water used as a scrubbing liquor is so high that the escaping $NH_3$ is bound to contain $H_2S$ in an amount of the order of and above 100 ppm. Whereas the purity of the ammonia can be increased by a subsequent scrubbing with pure water, this involves a loss of ammonia and results either in a sewage which can be discarded only with difficulty or in loading of the process cycle with additional water if this loss in yield is to be compensated.

In accordance with German Patent 1,205,956, ammonia which is allegedly as pure as synthetic ammonia can be recovered from ammonia water which is similar in composition. In this case the ($CO_2$ + $H_2S$) : $NH_3$ weight ratio in the solutions concerned approximates unity. This process has also the disadvantage that water must be added to the previously concentrated gas water at a high rate of up to one-third of the raw water rate, and that the escaping vapors must not contain acid gases in excess of 33% by volume, in most cases only 15% by volume. Besides, that process is operated under atmospheric pressure in all stages.

In accordance with French Patent 1,106,881, carbon dioxide is removed from aqueous solutions of ammonia, such as gas water, in which the weight ratio of the acid constituents to ammonia approximately unity, although carbon dioxide is removed only in part and in no case entirely under the pressures of 2 – 6 kg/cm² described there. That process is not directed to the production of ammonia of very high purity, and there is no need to remove virtually all hydrogen sulfide.

Australian Patent Application 206,296 relates also to the pressure decarbonization of strong ammonia water in which the weight ratio of the acid constituents to ammonia approximates unity, and also describes a partial de-acidification up to about 60%. More is not achieved by the measures described there. In that case too, the ($CO_2$ + $H_2S$) : $NH_3$ ratio also approximates unity and a complete removal of $H_2S$ is not aimed at.

In accordance with U.S. Pat. No. 2,018,863, ammonia is also recovered from gas water. In that process, not all of the ammonia but only part thereof, preferably only about one-third, is to be recovered as free ammonia. A major part of the ammonia is combined with sulfuric acid which is supplied. The present process has nothing to do with that object of the prior invention. Besides, the prior process is apparently carried out only under atmospheric pressure.

In accordance with U.S. Pat. No. 2,162,838, hot gases produced by the distillation of coal are scrubbed with a weakly ammoniacal aqueous solution. The spent scrubbing liquor is initially distilled at a low temperature and in a vacuum. The effluent from the process cycle described there is a mixture which contains the compounds $NH_3$, $H_2S$, and $HCN$ approximately in the ratio in which they are contained in the raw gas. Residual $CO_2$ may be removed from the scrubbing and cooling liquor by repeated distillation. The recovery of pure ammonia is not an object of that process. On the contrary, it is recommended to recover ammonia as ammonium sulfate, and any residual $H_2S$ must be removed by an addition of iron oxide.

U.S. Pat. No. 3,556,721 relates to the purification of coke oven gases with formation of raw ammonia water. That prior process does not relate to the production of ammonia of very high purity, and the measures adopted in the present process for producing ammonia of very high purity cannot be derived from the prior process.

A number of other processes of recovering ammonia from gas water are known. Apparently because it was believed that a distillation of gas water and the like would not produce desired results, ammonia and the acid constituents are taken up in these processes by solid or liquid sorption agents, such as activated carbon, alkanolamines, sulfuric acid, and the like, and these sorption agents must subsequently be treated for a recovery of ammonia and may have to be regenerated.

The state of the art contains no teachings for a controlled and simple recovery of ammonia of very high purity from solutions having the stated concentrations and the started weight ratios of the acid constituents to ammonia.

SUMMARY

The present process avoids the disadvantages involved in the state of the art by making it possible to recover ammonia in the above-mentioned purity and with a yield of virtually 100% from gas waters and other solutions having the stated composition in an economical and technologically progressive manner and without use of extraneous scrubbing and sorption agents and with a quantitative removal of $CO_2$ and $H_2S$ together with the inert gases from the ammonia whereas a waste water results which is suitable for biological purification.

The present invention thus provides a continuous process of recovering pure, concentrated ammonia, which contains not more than 0.2% $H_2O$, 0.1% $CO_2$, 10 ppm $H_2S$, and 10 ppm $HCN$, from aqueous liquors which have been preferably freed from dust, tar, oil, and phenols and which consist particularly of condensates formed during the gasification or degasification of coal, or from aqueous liquors of similar composition, which contain free and/or combined ammonia in concentrations between 0.1 and 12 n preferably between 0.3 and 3 n, carbon dioxide in concentrations between 0.1 and 12 n, preferably 0.2 to 3 n, hydrogen sulfide in concentrations between 0.003 and 3 n, preferably 0.03 to 0.3 n, hydrocyanic acid in concentrations between 0.001 to 1 g/l, and possibly residual organic substances introduced during a preceding dephenolation, which process comprises the known steps of stripping off gas water, de-acidification, scrubbing, and withdrawing ammonia from the top of a scrubbing column, and is characterized by the following process steps:

a. Ammonia is stripped from the aqueous mixture in a stripping column having 15–80, preferably 40–60, actual plates or equivalent packing columns and operated under a pressure of 1–2 bars and with an inlet temperature of 30°–90° C, preferably 40°–60° C, the ammonia and the acid constituents being jointly withdrawn from the top of the column and waste water being withdrawn from the sump of the column;

b. The ammonia-containing gas mixture which has thus been stripped off is scrubbed with an aqueous solution which contains surplus ammonia and from which the acid constituents have been removed to a large extent under a pressure of 1–2 bars and at temperatures of 30°–70° C, and pure ammonia is withdrawn overhead and is subjected to a fine purification, if desired, in known manner by being liquefied and treated to remove inert constituents;

c. In a stripping column having 3–25, preferably 5–15 plates or equivalent packing columns, most of the residual ammonia is stripped from the spent scrubbing liquor obtained in step b); the stripping column is operated under 1–2 bars, at top temperatures of 50°–80° C, preferably 55°–70° C, and sump temperatures of 60°–90° C, preferably 70°–80° C, and ammonia is withdrawn overhead and recycled to step b); and d. Aqueous solutions having a ($CO_2$ + $H_2S$) : $NH_3$ ratio $\geq$ 1 are de-acidified under superatmospheric pressure in that the acid constituents are stripped in a pressure de-acidification column operated under a pressure of 3–25 bars, preferably 3–7 bars, and with sump temperatures of 110°–180° C, preferably 135°–150° C, and are withdrawn from the top of said column, which steps are carried out in the sequence a), b), c), d), and the sump product of step c) is subjected to step d) in the processsing of solutions in which the ($CO_2$ + $H_2S$) : $NH_3$ weight ratio $\leq$ 1 whereas the feed solutions is subjected to the pressure de-acidification step d) and this is succeeded by steps a), b), c) in the processing of solutions having a ($CO_2$ + $H_2S$) : $NH_3$ weight ratio $\geq$ 1.

DESCRIPTION OF THE DRAWING

The present invention will be more fully understood from the following description taken in conjunction with the accompnying drawing wherein:

FIGS. 1 through 6 are tables setting forth the results of Examples 1 through 6 respectively which are carried out according to the procedure in the description below; and FIG. 7 is a schematic flow diagram for carrying out the process according to the invention.

DESCRIPTION

According to a preferred feature of the invention, 5–20% of the waste water withdrawn from the sump of the stripping column used in step a) are cooled behind said stripping column, the cooled waste water is fed to the top of the pressure de-acidification column used in step d) and said waste water is used to scrub residual ammonia from the escaping acid gases.

According to a further preferred feature of the invention, the overhead product of the stripping column used in step a) is cooled to 50°-80° C and subsequently fed to the scrubbing column used in step b) and liquid which has been condensed by said cooling is recycled to the stripping column used in step a). In this way the water vapor content of the gases to the scrubbing column is decreased.

The scrubbing liquor used in step b) in the scrubbing section consists preferably of a dilute ammonium carbonate solution which contains a considerable surplus of ammonia and may also contain $H_2S$ and/or HCN. The temperature of this scrubbing liquor is suitably selected so that the scrubbing step is carried out at the required temperature. The measure adopted in accordance with the invention ensure that the ammonia withdrawn from the top of the scrubbing column will not be contaminated with $H_2S$ or HCN, as is the case in accordance with German Patent 118,765.

Part of the scrubbing liquor used in step b) may be desirably obtained in that liquid ammonia used as a scrubbing liquor for the fine purification is mixed with water, preferably in an $NH_3:H_2O$ weight ratio of 1:4, and the resulting mixture is cooled to or below 40° C and is then conducted in a countercurrent to the ammonia vapors in the top portion of the scrubbing column used in step b).

According to another preferred feature of the invention, the sump product of the pressure de-acidification column used in step d) is fed in part to the upper portion of the scrubbing column and in part to the top portion of the stripping column. The feed rate to the scrubbing column will depend on the rate which acid constituents are to be scrubbed off.

Any residual solvent enriched in the upper portion of the pressure de-acidification column may be removed by a separator, which may be included, if desired, in a side stream flow path, and optionally recycled to a preceding phenol extraction process. This modification of the invention may be particularly used if step d) is carried out at the beginning of the process.

According to a further preferred feature of the invention, air or oxygen, preferably air, is blown at a low rate into the sump of the pressure de-acidification column used in step d) or into heat exchangers associated with the pressure de-acidification column. The rate of air or oxygen can easily be controlled so that the molar ratio of oxygen to HCN in the pressure de-acidification column is smaller than unity.

Another preferred feature of the invention resides in that 5-25%, preferably 10%, of the feed for the pressure de-acidification column are branched off and cooled to 20°-50° and are fed to said column in an intermediate portion thereof disposed above the inlet for the major part of the mixture to be processed and below the scrubbing section of the de-acidification column whereas the major part of the feed for the pressure de-acidification column, amounting to 75-95% of said feed, is heated in a heat exchanger by means of the sump product of the pressure de-acidification column in depence on the pressure and concentrating of the feed solution.

Both variants of the process may be used, on principle, to process solutions in which the $(CO_2 + H_2S) : NH_3$ weight ratio is equal to unity or approximates unity.

In the processing of solutions of the kind discussed here it may be possible to modify the process in a manner which is readily derived from the measures of the process according to the invention, e.g., as regards the dimensioning of the columns described, the number of plates, and changes of the pressures described, in dependence on the concentrations of $H_2S$ and/or HCN if these are unusually high or unusually low.

The conditions in the ammonia-stripping column used in step c) are critical. It has been found that the conditions taught by the invention must be particularly strictly adhered to in said column, particularly in the processing of solutions having relatively high concentrations of $H_2S$. At temperatures below 50° C, too much ammonia remains in the sump, and at top tempreatures above 80° C the $H_2S$ content of the gases recycled to the scrubbing column increases so suddenly that it is desirable to operate in the preferred range of 55°-70° C and under a pressure of 1-2 bars.

If the weight ratio between the acid constituents and the ammonia is equal to or approximates unity, the selection of the process sequence will be governed by various considerations, which include the economy, the pressure level of the steam available, fluctuations of the consideration of the feed solutions and of the contents of inert constituents (nitrogen) introduced in preceding processing steps. For instance, when only low-pressure steam is available, it may not be desirable to supply the feed solution to the stripping column. If the concentrations fluctuate whereas the weight ratio is approximately constant, the feed solution is preferably fed to the pressure de-acidification column.

The process is shown in FIG. 7 of the drawing and will be described more fully in the following Examples. The letters indicate the composition of the streams and the numbers designate the most important parts of the plant. The flow rates are stated in the Examples in kilograms per hours.

| | |
|---|---|
| A | feed solution |
| B | waste water |
| C | acid exhaust gas |
| D | ammonia |
| E | effluent from pressure de-acidification column |
| F | effluent from $NH_3$-stripping column |
| G | cooled branch stream from effluent from pressure de-acidification column; this branch stream is fed to scrubbing column |
| H | cooled branch stream from effluent from pressure de-acidification column; this branch stream is fed to stripping column |
| I | overhead product of stripping column |
| K | overhead product of scrubbing column |
| L | $NH_3$ gas from fine scrubber |
| M | sump product from $NH_3$ fine scrubber |
| O | water fed to inert gas scrubber |
| P | effluent from inert gas scrubber |
| Q | inert constituents withdrawn from inert gas scrubber |
| R | feed for $NH_3$-stripping column |
| S | overhead product from $NH_3$-stripping column |
| T | part of aqeous scrubbing liquor; this part is fed to top of de-acidification column |
| U | organic phase, solvents separated in pressure de-acidifier |
| 1 | pressure de-acidification column (d) |
| 2 | stripping column (a) |
| 3 | scrubbing column (b) |
| 4 | $NH_3$-stripping column (c) |
| 5 | $NH_3$ fine scrubber |
| 6 | inert gas scrubber |

In the example which will be explained hereinafter, the ($CO_2$ + $H_2S$) : $NH_3$ weight ratio $\geq$ 1.

The gas water is heated from about 40° to 50° C by heat exchange with the bottom product of the de-acidifier up to about 90° to 120° C and is fed to the de-acidification column 1. This gas water comes, e.g., from the gas cooling step of a pressure gasification plant and has previously been subjected to dust-, tar- and oil-separating steps and has been dephenolated by an extraction with solvents. About 10% of the gas water A may be cooled to 35° C and fed to an intermediate stage of the scrubbing section of the pressure de-acidification column 1. The sump product (F) of the $NH_3$-stripping column 4 is fed to the stripping section of the pressure de-acidification column 1.

The pressure de-acidification column 1 consists of a lower stripping section and an upper scrubbing section. The stripping section is heated with steam in the usual manner. A mixture of acid gases with admixtures of water vapor and ammonia escapes from the stripping section. In the overlying scrubbing section, water vapor and ammonia are removed from the acid gases leaving the stripping section by means of cooled scrubbing water or preferably by means of a cooled portion of the feed solution (A). The acid gases (C) leaving the scrubbing section of the de-acidification column are virtually free from $H_2O$ and $NH_3$ and may be fed, e.g., to a sulfur-recovering plant.

The sump product (E) of the pressure de-acidification column 1 contains virtually all ammonia which has been fed to the de-acidifier, also water and residual $CO_2$, $H_2S$ and HCN (E). The ratio of these residual components to the $NH_3$ content depends on the pressure, the number of plates, and the temperature in the column 1. The sump product (E) from the de-acidification column 1 may be cooled, if desired, and is fed in part (H) to the stripping column (2) and in part (G) to the scrubbing column 3.

In stripping column 2, which is supplied with heat, stream (H) is separated into waste water (B+T+O) and vapors (I), which are cooled at the top of the stripping column and then contain in addition to water vapor virtually all $NH_3$, $CO_2$, and $H_2S$ which have been fed to the stripping column. These vapors (I) are fed to the lower portion of the scrubbing column 3 together with the overhead product (S) from the $NH_3$-stripping column 4.

The scrubbing column 3 is fed at its top with the $NH_3$-enriched liquors (P+M) and (G), the rate of which is so controlled that when the acid constituents ($H_2S$, HCN, and $CO_2$) have been absorbed and $H_2O$ has been substantially condensed from the gases I and S the liquor R fed to the $NH_3$-stripping column 4 always contains $NH_3$ in a substantial surplus. To dissipate the heat which becomes available, the scrubbing column is provided with circulating cooling stages. The overhead product (K) leaving the scrubbing column 3 does not contain more than 100 ppm $H_2S$, 10 ppm HCN, and about 0.2% $CO_2$ and has an $H_2O$ content depending on the temperature at tha top of scrubbing column 3. This water can be removed in a usual manner, e.g., in that the vapors are compressed and cooled and then scrubbed in 5 with counterflowing liquid $NH_3$ whereby the content of acid gases is also further reduced.

The purified $NH_3$ gas (L) may be compressed in further stages and may be liquefied by a suitable cooling step. Alternatively, the fine scrubber 5 may be fed with $NH_3$ gas which has been compressed to a liquefaction pressure. The effluent (M) from the fine scrubber 5 is mixed with water from the inert gas scrubber 6 and is fed as $NH_3$-water to the top of the scrubbing column 3. The effluent (R) from the scrubbing column 3 is fed to the $NH_3$-stripping column 4, in which heat is supplied and surplus ammonia (S) is stripped off as an overhead product. The sump solution (F) of the $NH_3$-stripping column 4 is pumped into the pressure de-acidification column 1.

This variant of the process can be diagrammatically represented by the column sequence 1, 2, 3, 4. In the processing of solutions having a ($CO_2$ + $H_2S$) : $NH_3$ weight ratio $\leq$ 1, the columns are used in the sequence 2, 3, 4, 1.

Examples 1 – 6 were carried out using the flow diagram of FIG. 7 and the results are set forth in tabular form in FIGS. 1 – 6.

What is claimed is:

1. In a continuous process of recovering pure, concentrated ammonia, which contains not more than 0.2% $H_2O$, 0.1% $CO_2$, 10 ppm $H_2S$, and 10 ppm HCN, from aqueous liquors from which dust, tar, oil, and phenols have been removed, said aqueous liquors being condensates formed during the gasification or degasification of coal, or from aqueous liquors of similar compositions which contain free and/or combined ammonia in concentrations between 0.1 and 12 n carbon dioxide in concentrations between 0.1 and 12 n, hydrogen sulfide in concentrations between 0.003 and 3 n hydrocyanic acid in concentrations between 0.001 to 1 g/l, and residual organic substances introduced during a preceding dephenolation, which process includes the steps of stripping off gas water, de-acidification, scrubbing, and withdrawing ammonia from the top of a scrubbing column, the improvement which comprises the following steps:

a. stripping ammonia from the aqueous liquor in a stripping column having 15–80 actual plates or equivalent packing columns operated under a pressure of 1–2 bars with an inlet temperature of 30°–90° C, the ammonia and the acid constituents being jointly withdrawn overhead and waste water being withdrawn from the sump of the column, b. scrubbing the overhead product from (a) with an aqueous solution containing surplus ammonia from which the acid constituents have been substantially removed under a pressure of 1–2 bars and at temperatures of 30°–70° C withdrawing pure ammonia overhead and subjecting it to a fine purification by liquification and treatment to remove inert constituents;

c. stripping most of the residual ammonia from the spent scrubbing liquor from (b) in a stripping column having 3–25 plates, or equivalent packing columns, operated under 1–2 bars, top temperatures of 50°–80° C, and sump temperatures of 60°–90° C, and withdrawing ammonia overhead and recycling it to (b); and d. de-acidifying aqueous solutions having a ($CO_2$ + $H_2S$) ; NH ratio $\geq$ 1 under superatmospheric pressure by stripping the acid constituents in a pressure de-acidification column operated under a pressure of 3–25 bars, and sump temperatures of 110°–180° C, and withdrawing same from the top of said column;

said steps being carried out in the sequence a), b), c), d), with the sump product of step c) being subjected to step d) in the processing of solutions in which the ($CO_2$ + $H_2S$) : $NH_3$ weight ratio $\leq$ 1 whereas the feed solution is subjected to the pressure de-acidification step d) and this is succeeded by steps a), b), c) in the processing of solutions having a ($CO_2$ + $H_2S$) : $NH_3$ weight ratio > 1.

2. Process of claim 1 werein the sump product from the pressure de-acidification column used in step d) is used in part as scrubbing liquor in scrubbing step b) and is fed in part to stripping step a).

3. Process of claim 1 wherein 5-20% of the waste water withdrawn from the sump of the stripping column used in step a) is cooled and fed as aqueous scrubbing liquor to the top of the pressure de-acidification column used in step d).

4. Process of claim 1 wherein liquid ammonia is mixed with water, the resulting mixture is cooled to or below 40° C and is then conducted in a countercurrent to the ammonia vapors in the top portion of the scrubbing column used in step b).

5. Process of claim 1 wherein heat exchangers associated with the pressure de-acidification column are fed with air.

6. Process of claim 1 wherein residual solvent which becomes enriched in the upper portion of the pressure de-acidification column used in step d) are removed by a separator disposed within the pressure de-acidification column recycled to a preceding phenol extraction process.

7. Process of claim 1 wherein 5-25%, by weight of the feed for the pressure de-acidification column used in step d) are branched off and cooled and fed to said column in an intermediate portion thereof disposed above the inlet for the major part of the mixture to be processed and below the scrubbing section of the column used in step d) whereas a major part of the mixture to be processed is heated in a heat exchanger by means of the sump product of the column.

8. Process of claim 1 wherein the stripping of ammonia from the aqueous liquor in step (a) is performed in a stripping column having 40 to 60 actual plates;

9. Process of claim 1 wherein the stripping column in step (a) is operated with an inlet temperature of 40° to 60° C;

10. Process of claim 1 wherein the stripping of ammonia from the spent scrubbing liquor in step (c) is performed in a column having 5 to 15 plates;

11. Process of claim 1 wherein the top temperatures of the column in step (c) is 55° to 70° C and the sump temperature 70° to 80° C;

12. Process of claim 1 wherein the stripping of the acid constituents in step (d) is performed in a pressure deacidification column under a pressure of 3 to 7 bars and sump temperature of 135° to 150° C.

13. Process of claim 4 wherein liquid ammonia is mixed with water in a weight ratio of 1:4 before cooling of the resulting mixture and conducting to the ammonia vapors in the top portion of scrubbing column used in step (b).

14. Process of claim 5 wherein heat exchangers associated with the pressure de-acidification column are fed with air in an $O_2$:HCN molar ratio below 1.

15. Process of claim 6 wherein the enriched residual solvent in the upper portion of the pressure de-acidification column used in step (d) is removed by a side stream flow path.

16. Process of claim 7 wherein 10% by weight of the feed for the pressure de-acidification column used in step (d) are branched off, cooled and fed to said column.

17. In a continuous process of recovering pure, concentrated ammonia, which contains not more than 0.2% $H_2O$, 0.1% $CO_2$, 10 ppm $H_2S$, and 10 ppm HCN, from aqueous liquors from which dust, tar, oil, and phenols have been removed, said aqueous liquors being condensates formed during the gasification or degasification of coal, or from aqueous liquors of similar compositions which contain free and/or combined ammonia in concentrations between 0.1 and 12 n, carbon dioxide in concentrations between 0.1 and 12 n, hydrogen sulfide in concentrations between 0.003 and 3 n, hydrocyanic acid in concentrations between 0.001 to 1 g/l, and residual organic substances introduced during a preceding dephenolation, which process includes the steps of stripping off gas water, de-acidification, scrubbing, and withdrawing ammonia from the top of a scrubbing column, the improvement which comprises the following steps:

a. stripping ammonia from the aqueous liquor in a stripping column having 15-80 actual plates or equivalent packing columns operated under a pressure of 1-2 bars with an inlet temperature of 30°-90° C, the ammonia and the acid constituents being jointly withdrawn overhead and waste water being withdrawn from the sump of the column, b. scrubbing the overhead product from (a) with an aqueous solution containing surplus ammonia from which the acid constituents have been substantially removed under a pressure of 1-2 bars and at temperatures of 30°-70° C withdrawing pure ammonia overhead and c. stripping most of the residual ammonia from the spent scrubbing liquor from (b) in a stripping column having 3-25 plates, or equivalent packing columns, operated under 1-2 bars, top temperatures of 50°-80° C, and sump temperatures of 60°-90° C, and withdrawing ammonia overhead and recycling it to (b); and d. de-acidifying aqueous solutions having a ($CO_2$ + $H_2S$); NH ratio $\geq$ 1 under superatmospheric pressure by stripping the acid constituents in a pressure de-acidification column operated under a pressure of 3-25 bars, and sump temperatures of 110°-180° C, and withdrawing same from the top of said column;

said steps being carried out in the sequence a), b), c), d), with the sump product of step c) being subjected to step d) in the processing of solutions in which the ($CO_2$ + $H_2S$) : $NH_3$ weight ratio $\leq$ 1 whereas the feed solution is subjected to the pressure de-acidification step d) and this is succeeded by steps a), b), c) in the processing of solutions having a ($CO_2$ + $H_2S$) : $NH_3$ weight ratio > 1.

* * * * *